(12) United States Patent
Gerze (10) Patent No.: US 9,632,196 B2
(45) Date of Patent: Apr. 25, 2017

(54) METHOD AND DEVICE FOR ESTIMATING A RELATIVE POSITION BETWEEN TOWED ACOUSTIC LINEAR ANTENNAS

(71) Applicant: SERCEL, Carquefou (FR)

(72) Inventor: Christophe Gerze, Carquefou (FR)

(73) Assignee: SERCEL, Carquefou (FR)

(*) Notice: Subject to any disclaimer, the term of this patent is extended or adjusted under 35 U.S.C. 154(b) by 309 days.

(21) Appl. No.: 14/186,752

(22) Filed: Feb. 21, 2014

(65) Prior Publication Data

US 2014/0233351 A1 Aug. 21, 2014

(30) Foreign Application Priority Data

Feb. 21, 2013 (EP) ..................... 13305196

(51) Int. Cl.
*G01V 1/38* (2006.01)

(52) U.S. Cl.
CPC .................. *G01V 1/3835* (2013.01)

(58) Field of Classification Search
CPC ... G01V 1/3817; G01V 1/3835; G01V 1/3826
See application file for complete search history.

(56) References Cited

U.S. PATENT DOCUMENTS

| | | | | |
|---|---|---|---|---|
| 3,174,128 A | * | 3/1965 | Dow | G01S 1/72 367/106 |
| 4,532,617 A | * | 7/1985 | Baecker | G01S 15/74 367/106 |
| 4,559,621 A | * | 12/1985 | Delignieres | G01S 5/0036 367/106 |

(Continued)

FOREIGN PATENT DOCUMENTS

| | | |
|---|---|---|
| EP | 2541282 A1 | 1/2013 |
| FR | 2947390 B1 | 12/2010 |

OTHER PUBLICATIONS

Y. Liu and Z. Yang, Location, Localization, and Localizability: Location-awareness Technology for Wireless Networks, DOI 10.1007/978-1-4419-7371-9_3, Springer Science+Business Media, LLC 2011.*

(Continued)

*Primary Examiner* — Luke Ratcliffe
*Assistant Examiner* — Hovhannes Baghdasaryan
(74) *Attorney, Agent, or Firm* — IPSILON USA, LLP (57) ABSTRACT

A method for estimating a position of a first acoustic linear antenna relative to a second acoustic linear antenna belonging to a network of towed acoustic linear antennas on which are arranged a plurality of nodes. The method includes: setting a first plurality of nodes arranged on the first antenna to act as sender nodes and a second plurality of nodes arranged on the second antenna to act as receiver nodes; forming a first group of sender nodes each sending a same first acoustic signature; for each receiver node: obtaining a propagation duration and establishing a geometrical figure representative of potential positions of a sender node, based on the propagation duration and the first acoustic signature; determining a set of common points between the geometrical figures; estimating the position of the first antenna relative to the second antenna based on the set of common points.

8 Claims, 6 Drawing Sheets

(56) References Cited

U.S. PATENT DOCUMENTS

| | | | | |
|---|---|---|---|---|
| 4,567,582 | A * | 1/1986 | Kuhn | G01V 1/303 367/56 |
| 4,912,682 | A * | 3/1990 | Norton, Jr. | G01V 1/3835 367/19 |
| 4,970,698 | A * | 11/1990 | Dumestre, III. | G01S 5/22 181/110 |
| 4,992,990 | A * | 2/1991 | Langeland | G01S 15/87 367/19 |
| 5,031,159 | A * | 7/1991 | Rouquette | G01V 1/38 367/125 |
| 5,353,797 | A * | 10/1994 | Matsushima | G01S 15/8918 600/447 |
| 5,668,775 | A * | 9/1997 | Hatteland | G01V 1/3835 367/127 |
| 5,889,490 | A * | 3/1999 | Wachter | G01S 17/36 342/127 |
| 6,028,823 | A * | 2/2000 | Vincent | G01C 13/00 367/43 |
| 6,697,300 | B1 * | 2/2004 | Holt | G01S 5/0284 367/127 |
| 7,190,634 | B2 * | 3/2007 | Lambert | G01S 1/72 367/128 |
| 8,724,426 | B2 * | 5/2014 | Welker | B63B 21/66 367/19 |
| 2004/0141355 | A1 * | 7/2004 | Robertsson | G01V 1/3835 365/145 |
| 2005/0058022 | A1 | 3/2005 | Kitchin et al. | |
| 2005/0180263 | A1 * | 8/2005 | Lambert | G01S 1/72 367/128 |
| 2006/0239122 | A1 * | 10/2006 | Vigen | G01V 1/3835 367/131 |
| 2007/0091719 | A1 * | 4/2007 | Falkenberg | G01V 1/3835 367/19 |
| 2007/0257838 | A1 * | 11/2007 | Cheng | G01S 19/05 342/357.42 |
| 2008/0008031 | A1 * | 1/2008 | Vigen | G01V 1/3835 367/15 |
| 2008/0025146 | A1 | 1/2008 | Welker | |
| 2009/0177395 | A1 * | 7/2009 | Stelpstra | G01S 19/258 701/469 |
| 2009/0245019 | A1 | 10/2009 | Falkenberg et al. | |
| 2010/0118645 | A1 * | 5/2010 | Welker | B63B 21/66 367/17 |
| 2010/0329075 | A1 | 12/2010 | Mellier et al. | |
| 2011/0273958 | A1 * | 11/2011 | Xia | G01V 1/3817 367/21 |
| 2012/0300582 | A1 * | 11/2012 | Winter | G01S 3/8022 367/19 |
| 2012/0327741 | A1 * | 12/2012 | Pearce | G01V 1/3835 367/19 |
| 2013/0003503 | A1 * | 1/2013 | L'Her | G01V 1/3817 367/106 |
| 2013/0046472 | A1 * | 2/2013 | Cantillo | G01V 1/3835 702/5 |
| 2014/0094695 | A1 * | 4/2014 | Jain | A61B 8/0841 600/424 |

OTHER PUBLICATIONS

Lay, David. Linear Algebra and Its Applications, 3/E. Pearson © 2002. pp. 146, 418-421.*

Charles D. Ghilani. Adjustment Computations: Spatial Data Analysis, Fifth Edition. Copyright © 2010 John Wiley & Sons, Inc. pp. 240-265.*

European Search Report dated Jul. 26, 2013 for corresponding European Application No. 13305196.1, filed Feb. 21, 2013.

* cited by examiner

METHOD AND DEVICE FOR ESTIMATING A RELATIVE POSITION BETWEEN TOWED ACOUSTIC LINEAR ANTENNAS

1. FIELD OF THE INVENTION

The field of the invention is the acquisition of geophysics data. It deals with the equipments required to study the sea bed and its sediment layers properties.

More specifically, the invention pertains to a technique for estimating a position of an acoustic linear antenna relatively to another acoustic linear antenna belonging to a network of towed acoustic linear antennas.

The invention can be applied notably to the oil prospecting industry using seismic method (sea oil survey), but can be of interest for any other field which requires a system performing geophysics data acquisition in a marine environment.

2. TECHNOLOGICAL BACKGROUND

It is sought more particularly here below in this document to describe problems existing in the field of seismic data acquisition for oil prospecting industry. The invention of course is not limited to this particular field of application but is of interest for any technique that has to cope with closely related or similar issues and problems.

The operations of acquiring seismic data on site conventionally use networks of sensors (here below designated as "hydrophones" with regard to the acquisition of data in a marine environment). The hydrophones are distributed along cables in order to form linear acoustic antennas hereafter referred to as "streamers" or "seismic streamers".

Figure 1:
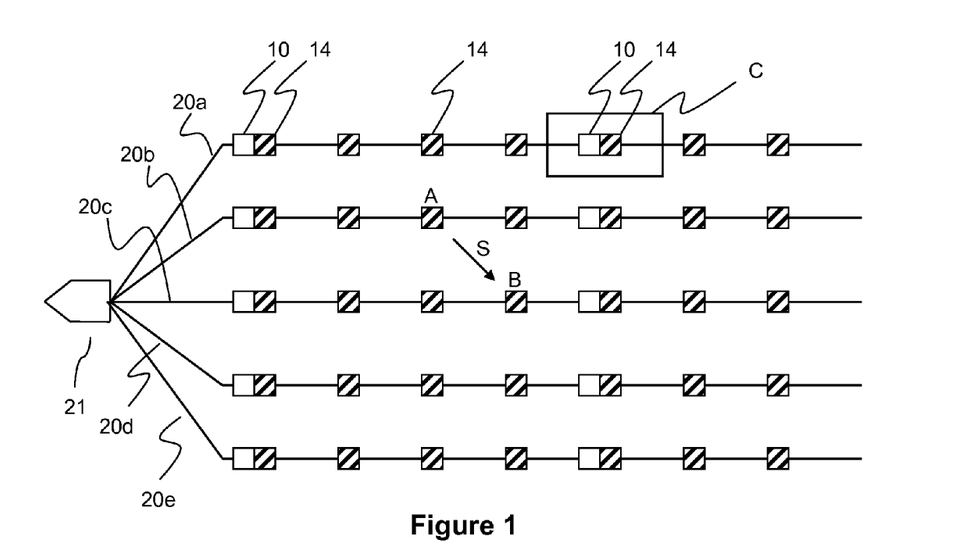
FIG. 1, already described with reference to the prior art, presents an example of network of seismic streamers towed by a seismic vessel.

As shown in FIG. 1, the network of seismic streamers 20a to 20e is towed by a seismic vessel 21. The hydrophones are referenced 16 in FIG. 2, which illustrates in detail the block referenced C in FIG. 1 (i.e. a portion of the streamer referenced 20a).

The seismic method is based on analysis of reflected seismic waves. Thus, to collect geophysical data in a marine environment, one or more submerged seismic sources are activated in order to propagate omnidirectional seismic wave trains. The pressure wave generated by the seismic source passes through the column of water and insonifies the different layers of the sea bed. Part of the seismic waves (i.e. acoustic signals) reflected are then detected by the hydrophones distributed over the length of the seismic streamers. These acoustic signals are processed and retransmitted by telemetry from the seismic streamers to the operator station situated on the seismic vessel, where the processing of the raw data is carried out.

A well-known problem in this context is the localization of the seismic streamers. Indeed, it is important to precisely locate the streamers, in particular for:
- monitoring the position of the hydrophones in order to obtain a satisfactory precision of the image of the sea bed in the exploration zone;
- detecting the movements of the streamers with respect to one another (the streamers are often subjected to various external natural constrains of variable magnitude, such as the wind, waves, currents); and
- monitoring the navigation of streamers, in particular in a situation of bypassing an obstacle (such as an oil barge).

In practice, it is aimed to carry out an analysis of sea bed with a minimum number of passages of the vessel in the concerned area. For that purpose, the number of streamers implemented in the acoustic network is substantially raised. The aforesaid problem of localization of the streamers is thus particularly noticeably, especially in view of the length of the streamers, which may vary between 6 and 15 kilometers, for example.

Figure 2:
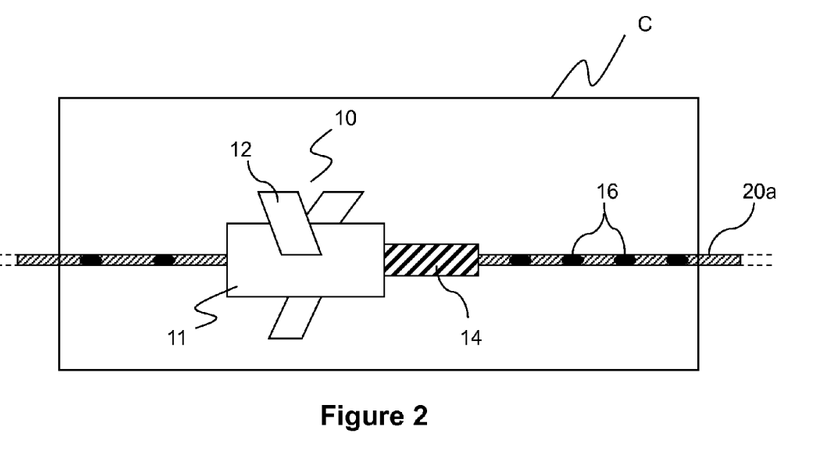
FIG. 2, already described with reference to the prior art, illustrates in detail a portion of the streamer of FIG. 1.

Control of the positions of streamers lies in the implementation of navigation control devices, commonly referred to as "birds" (white squares referenced 10 in FIG. 1). They are installed at intervals that are not necessarily regular (50, 150, 300, or 450 meters for example) along the seismic streamers. The function of those birds is to guide the streamers between themselves. In other words, the birds are used to control the depth as well as the lateral position of the streamers. For this purpose, and as illustrated in FIG. 2, each bird 10 comprises a body 11 equipped with motorized pivoting wings 12 (or more generally means of mechanical moving) making it possible to modify the position of the streamers laterally between them (this is referred to a horizontal driving) and drive the streamers in immersion (this is referred to a vertical driving).

To carry out the localization of the seismic streamers, allowing a precise horizontal driving of the streamers by the birds, acoustic nodes are distributed along the streamers. These acoustic nodes are represented by hatched squares, referenced 14, in FIGS. 1 and 2. As shown in FIG. 1, some acoustic nodes 14 of the network are associated with a bird 10 (case of FIG. 2), and other are not.

The acoustic nodes 14 use underwater acoustic communication means (hereafter referred to as electro-acoustic transducers), allowing to estimate the distances between acoustic nodes (named here below "inter-node distances"). More specifically, these transducers are transmitters and receivers of acoustic signals, which can be used to estimate an inter-node distance separating two acoustic nodes (acting as sender node and receiver node respectively) arranged on two different streamers (which may be adjacent or not) as a function of an acoustic signal propagation duration measured between these two nodes (i.e. a travel time of the acoustic signal from the sender node to the receiver node). From the acoustic network, this thereby forms a mesh of inter-node distances allowing knowing accurate horizontal positioning of all the streamers.

Usually, each acoustic node comprises an electro-acoustic transducer enabling it to behave alternately as a sender node and a receiver node for the transmission and the reception, respectively, of acoustic signals. In an alternative embodiment, a first set of nodes act only as sender nodes and a second set of nodes act only as receiver nodes. A third set of nodes (each acting alternately as a sender node and a receiver node) can also be used in combination with the first and second sets of nodes.

The inter-node distance $d_{AB}$ between two nodes A and B can be typically estimated on the basis of the following equation: $d_{AB} = c \cdot T_{AB}$, with:
- node A acting as a sender node which transmits an acoustic signal S to node B acting as a receiver node (see example in FIG. 1, with acoustic signal S shown as an arrow between nodes referenced A and B);
- $T_{AB}$, the propagation duration elapsed between the emission instant and reception instant of the acoustic signal transmitted from the sender node A to the receiver node B (assuming that the receiver node and the sender node are synchronized); and
- c, a "measured" or "estimated" value of sound speed (also referred to as underwater acoustic sound velocity) of the acoustic signal.

Computation of an inter-node distance can be carried out, either by the navigation system (for positioning the set of hydrophones), or the node manager system (for providing useful information to the birds for horizontal driving), or the acoustic nodes themselves (in case they are equipped with electronics intended for this computation). The acoustic nodes are further synchronized by the node manager system through a wire communication bus placed within the streamers.

In particularly, the positioning of seismic streamers in deployment or retrieve phase (transitory phase in which one or several streamers is or are deploying in water or retrieving from water) is a recurring problem that engineers must face, notably to prevent from the risk of tangles of streamers.

Usually, to estimate the position of a seismic streamer, the seismic streamers are equipped with magnetic compasses and/or GPS (for "Global Positioning System") receivers:
GPS receivers are installed at a few particular points such as on the towing vessel, the head and tail buoys connected to the streamers;
magnetic compasses deployed in greater numbers along the streamers in order to determine the deformations of the streamers between particular points.

This known solution however requires a time-consuming process and is not implementable to estimate the relative position of a seismic streamer in deployment or in retrieve phase. It requires the total deployment of network of streamers to estimative the position of the seismic streamer with respect to one another.

Another known solution, based on an underwater acoustic measurement method, is described in patent FR 2 947 390. It consists in estimating an inter-node distance separating two acoustic nodes (arranged on two different streamers), acting as sender node and receiver node, respectively, according to a predefined acoustic sending and receiving sequence. However, when a seismic streamer is in deployment or retrieve phase, this solution requires that the user reconfigures the acoustic sequence periodically (for example at each launch of an acoustic node) in order to update the mesh of inter-node distances. The implementation of such a solution is therefore irksome and time-consuming.

It would therefore seem to be particularly worthwhile to estimate the position of a seismic streamer in deployment or retrieve with respect to another one or a group of another seismic streamers already deployed, without necessarily having recourse to dedicated devices or a periodic reconfiguration of the acoustic sequence.

3. SUMMARY OF THE INVENTION

A particular embodiment of the invention proposes a method for estimating a position of a first acoustic linear antenna relatively to a second acoustic linear antenna belonging to a network of towed acoustic linear antennas on which are arranged a plurality of nodes, characterized in that the method comprises steps of:
(a) setting a first plurality of nodes arranged on said first acoustic linear antennas so that they act as sender nodes and a second plurality of nodes arranged on said second acoustic linear antenna so that they act as receiver nodes;
(b) forming at least a first group of sender nodes each sending a same first acoustic signature;
(c) for each receiver node:
obtaining a propagation duration elapsed between an emission instant of said first acoustic signature and a reception instant of said first acoustic signature received by said receiver node;
establishing a geometrical figure representative of potential positions of a sender node, as a function of the propagation duration obtained for said receiver node and said first acoustic signature;
(d) determining a set of common points between the geometrical figures established for said receiver nodes;
(e) estimating the position of said first acoustic linear antenna relatively to said second acoustic linear antenna as a function of said set of common points.

Thus the invention enables, thanks to a purely acoustic measurement system, to estimate the position of a towed acoustic linear antenna relatively to another one, other than by conventional means. To that end, the invention consists in establishing, by using acoustic measurements, geometrical figures each representative of the potential positions of a sender node around a receiver node. Thanks to this "blind deduction" (the receiver nodes do not know which sender node is sending), the method according to the invention does not require defining in advance a predetermined acoustic sending and receiving sequence. Thus, contrary to the known solution discussed above, the invention does not require reconfiguring every nodes of the acoustic network periodically in order to obtain an estimation of the position of an acoustic linear antenna in deployment or retrieve phase. This allows a faster and a more reliable and energy-efficient implementation of the acoustic antenna positioning.

In addition, thanks to this astute geometrical approach based on acoustic measurements, the method according to the invention does not require any dedicated conventional devices (like compass or GPS boys for example). This allows a simpler and cheaper implementation. The proposed solution is indeed capable of measuring the relative position of an acoustic linear antenna continuously (whatever the acoustic antenna is partially or totally deployed) and in an autonomous way, independently of any other devices.

According to a particular feature, the method further comprises a step of selecting, among the set of common points, a sub-set of common points taking into account predetermined distances between the sender nodes of said first group of nodes.

So it avoids taking into account common points that actually do not match with the sender nodes. The estimation of position of an acoustic linear antenna is therefore even more accurate.

According to a particular feature, the step (b) further comprises forming at least another group of sender nodes, each another group of sender nodes sending another distinct acoustic signature, and the steps (c), (d) and (e) are carried out for each another group of sender nodes sending a distinct acoustic signature, each receiver node being configured to receive all the signatures As each receiver node is able to receive all the signatures, and contrary to the known solution described on patent FR 2 947 390, the present invention does not require reconfiguring every nodes of the acoustic network periodically in order to obtain an estimation of the position of an acoustic linear antenna in deployment or retrieve phase. Indeed, the solution described on patent FR 2 947 390 implies that each receiver node needs to be associated with a specific sender node at each new reconfiguration of the acoustic sequence. This allows a faster and a more reliable and energy-efficient implementation of the acoustic antenna positioning.

Furthermore, sending other distinct acoustic signatures by other groups of sender nodes belonging to the first acoustic antenna leads to the inclusion of additional common points, thereby making the estimation of the position of the first acoustic antenna even more accurate. This also enhances possibility of discrimination of sender nodes in the network. Indeed, the sender nodes of a given group can be chosen as being far from each other in order to decrease the risk of improper detection by the receiver nodes.

According to a particular feature, said geometrical figure established for each receiver node comprises at least one portion of a circle having:
  as the centre, the position of said receiver node, and
  as the radius, an inter-node distance which is function of the propagation duration obtained for said receiver node and for said acoustic signature,
and the set of common points comprises intersection points of geometric figures established for pairs of consecutive receiver nodes.

The invention is thus based on the setting up of circles or circle portions whose the radius is representative of a potential inter-node distance between a receiver node and a sender node, the latter being arranged on the first acoustic antenna for which the relative position is seek. The intersection points thus obtained are then crossed with predetermined distances between sender nodes of the acoustic linear antenna in order to deduce, when they match, the position of the first acoustic antenna relatively to the second acoustic antenna.

According to a particular feature, said at least one portion of a circle is established in a predefined orthonormal basis in accordance with the following equation:

$$(x-a_i)^2+(y-b_i)^2=c^2 \cdot T^2$$

where:
$a_i$ and $b_i$ are the coordinates of a receiver node of index i,
c is a value of the underwater acoustic sound velocity,
T is the propagation duration obtained for the receiver node of index i.

In practice, abscissa $a_i$ corresponds to the offset of the receiver node i on the first acoustic antenna and ordinate $b_i$ can be set to zero in order to set the second acoustic antenna at the ordinate axis.

According to an advantageous feature, said geometrical figure established for each receiver node comprises a half-circle defined in a half-plan predetermined in relation to said second acoustic linear antenna.

So it avoids taking into account intersection points that actually do not match with the sender nodes in order to speed up the computation process.

According to another advantageous feature, if at least two distinct intersection points, for a same acoustic signature, are determined for two consecutive pairs of receivers nodes comprising a common receiver node, said two intersection points are assumed to be a single common point if said two intersection points have a gap lower a threshold value of gap.

This consideration allows improving the speed of calculations and enhancing the feasibility of the estimation of the relative position of the first acoustic antenna.

According to a particular feature, said first and second acoustic linear antennas are non-adjacent among the network of acoustic linear antennas.

This feature allows optimizing the directivity of acoustic signals and thereby enhancing even more the accuracy of propagation duration measurements carried out by the receiver nodes. Indeed, more the sender and receiver streamers are far from each other, more the directivity is improved.

In another embodiment, the invention pertains to a computer program product comprising program code instructions for implementing the above-mentioned method (in any of its different embodiments) when said program is executed on a computer or a processor.

In another embodiment, the invention pertains to a non-transitory computer-readable carrier medium, storing a program which, when executed by a computer or a processor causes the computer or the processor to carry out the above-mentioned method (in any of its different embodiments).

In another embodiment, the invention pertains to a device for estimating a position of a first acoustic linear antenna relatively to a second acoustic linear antenna belonging to a network of towed acoustic linear antennas on which are arranged a plurality of nodes, characterized in that said device comprises:
  means for setting a first plurality of nodes arranged on said first acoustic linear antennas so that they act as sender nodes and a second plurality of nodes arranged on said second acoustic linear antenna so that they act as receiver nodes;
  means for forming at least a first group of sender nodes each sending a same first acoustic signature;
  means for obtaining, for each receiver node, a propagation duration elapsed between an emission instant of said first acoustic signature and a reception instant of said first acoustic signature received by said receiver node;
  means for establishing, for each receiver node, a geometrical figure representative of potential positions of a sender node, as a function of the propagation duration obtained for said receiver node and said first acoustic signature;
  means for determining a set of common points between the geometrical figures established for said receiver nodes;
  means for estimating the position of said first acoustic linear antenna relatively to said second acoustic linear antenna as a function of said set of common points.

Advantageously, the device comprises means for implementing the steps it performs in the process of estimation as described above, in any of its various embodiments.

4. LIST OF FIGURES

Other features and advantages of embodiments of the invention shall appear from the following description, given by way of an indicative and non-exhaustive examples and from the appended drawings, of which.

5. DETAILED DESCRIPTION

In all of the figures of the present document, identical elements and steps are designated by the same numerical reference sign. FIGS. 1 and 2 have been already described above in relation with the prior art.

The invention is based on the establishment, from acoustic measurements, of a geometrical model representative of the potential positions of sender nodes arranged on a seismic streamer in order to estimate the position of that streamer relatively to another streamer or a group of another streamers belonging to the acoustic network. The invention makes possible to get away from dependence on the knowledge of acoustic sending sequences carried out by the nodes within the acoustic network. No periodic reconfiguration of the acoustic network is therefore necessary in case of deployment or retrieve of seismic streamers to allow an accurate localization and positioning of these streamers. The present solution notably enables to deploy or retrieve the network of streamers faster than the prior art solutions discussed above.

In addition, thanks to this astute approach only based on acoustic measurements, the method according to the invention does not require any dedicated conventional devices like compass or GPS boys for example.

Figure 3:
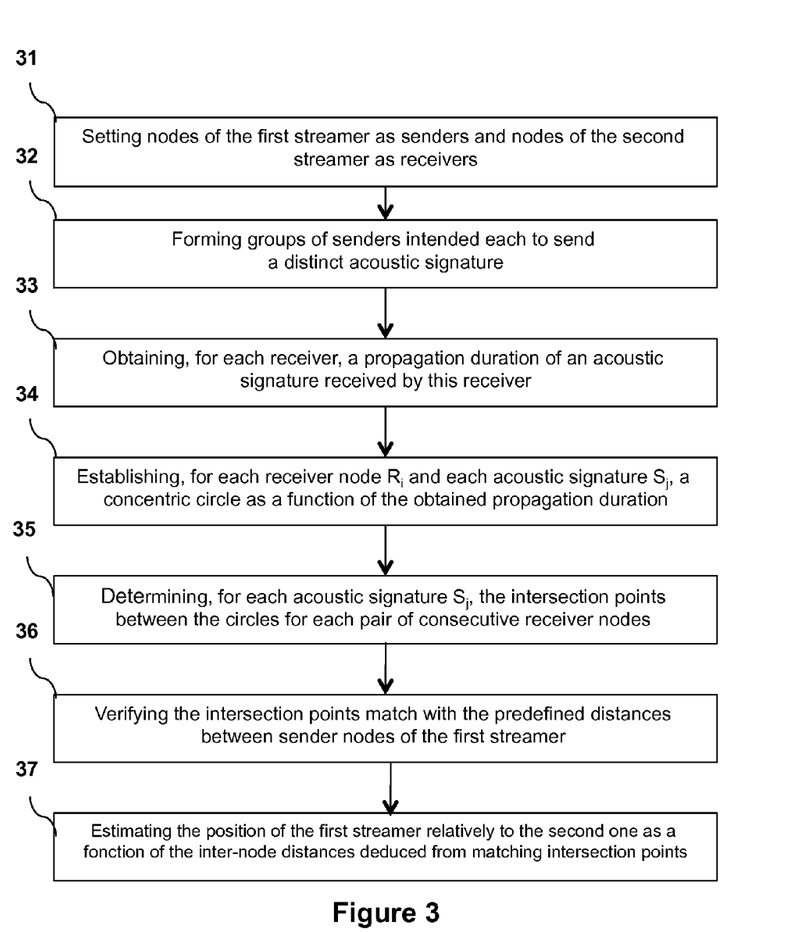
FIG. 3 is a flowchart of a particular embodiment of the method according to the invention.

Referring now to FIG. 3, we depict a flowchart of a particular embodiment of the method according to the invention.

Figure 6:
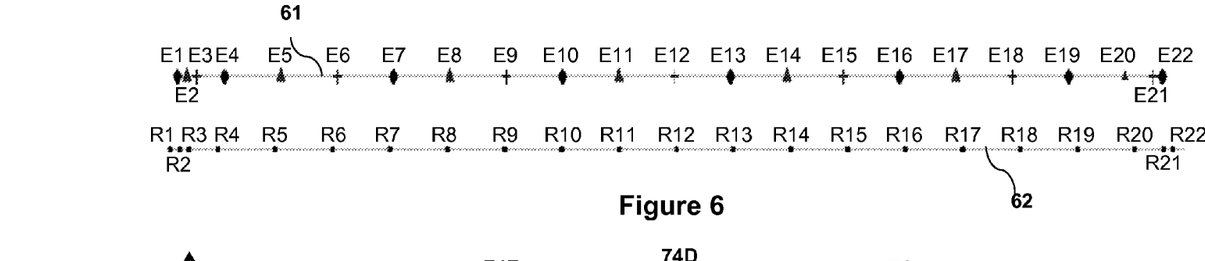
FIGS. 6 to 9 depict schematic illustrations of principle of implementation of the invention according to a particular embodiment.

In the following description, it is considered as an example the estimation of the position of a first seismic streamer 61, in deployment phase (i.e. which is partially deployed) relatively to a second seismic streamer 62 totally deployed, as shown in FIG. 6.

In step 31, the nodes arranged on the seismic streamer 61 (nodes E1 to E22 in FIG. 6) are initially set so as to act as sender nodes and the nodes arranged on the seismic streamer 62 (nodes R1 to R22 in FIG. 6) are initially set so as to act as receiver nodes respectively. In other words, step 31 consists in configuring the seismic streamer 61 as sender streamer and the streamer 62 as receiver streamer.

To make the description easier to read, the receiver nodes are hereafter referenced $R_i$ with $i \in [0, m]$, the sender nodes are referenced $E_i$ with $i \in [0, k]$, and the acoustic signature are referenced $S_j$ with $j \in [0,n]$. In the exemplary embodiment illustrated on FIGS. 6 to 9, m=22, k=22 and j=3.

In step 32, three groups of sender nodes belonging to the streamer 61 are formed:
a first group of sender nodes (E1, E4, E7, E10, E13, E16, E19, E22) intended to send a first acoustic signature $S_1$ for example having a frequency F1,
a second group of sender nodes (E2, E5, E8, E11, E14, E17, E20) intended to send a second signature $S_2$, for example having a frequency F2,
a third group of sender nodes (E3, E6, E9, E12, E15, E17, E21) intended to send a third acoustic signature $S_3$, for example having a frequency F3.

The nodes of the first, second and third groups are depicted by lozenges, triangles and crosses, respectively, in FIG. 6.

The fact of forming several groups of sender nodes, each group sending a distinct acoustic signal, leads to discriminate the acoustic signals intended to the receiver nodes arranged on the streamer 62, thereby decreasing the risk of improper detections.

In step 33, the first, second and third groups of sender nodes transmit the acoustic signature $S_1$, $S_2$, $S_3$ that is associated with them simultaneously (at a common clock starting). Then, each receiver node $R_i$ arranged on the other streamer 62 receives acoustic signatures coming from the sender nodes $E_i$ of the different groups but without knowing which one has sent the acoustic signature.

In an alternative embodiment, each group of sender nodes can send its own acoustic signature $S_j$ consecutively, for example in three consecutive time slot: a first time slot being dedicated to the sending of the first acoustic signal, a second one dedicated to the sending of the second acoustic signal and third one dedicated to the sending of the third acoustic signal.

It should be noted here that every sender $E_i$ and receiver $R_i$ nodes are synchronized by a common clock imposed by the node manager system through a wire communication bus placed within the streamers. A receiver node $R_i$ shall take into account, for each acoustic signature $S_j$, the acoustic signature firstly received in its listening temporal window.

According to a particular embodiment, a receiver node $R_i$ takes into account, for each acoustic signature $S_j$, the one that has the highest energy of any received signals in its listening temporal window.

For the first acoustic signature $S_1$ each receiver node $R_i$ of the streamer 62 measures the travel duration T elapsed between the emission instant (i.e. the clock starting) of the acoustic signature $S_1$ sent by a sender node of the first group and the reception instant by the receiver node $R_i$. Knowing the sound velocity c, an inter-node distance between can be then determined using the classical formula: $D = c \cdot T$.

This computation of inter-node distance can be carried out, either by the navigation system or the node manager system (the duration measurement T being feedbacked by the receiver node) or the receiver node $R_i$ itself (if it is equipped with electronics intended for this computation).

This operation is carried out in the same way for the second and third acoustic signatures $S_2$ and $S_3$.

At the end of this step 33, we obtain for each receiver node $R_i$ of the receiver streamer 62 and for each of the acoustic signatures $S_j$ received by this node, an inter-node distance, such as: $D_{i,j} = c \cdot T_{i,j}$.

In step 34, for each receiver node $R_i$ (with i comprised between 1 and 22) and for each acoustic signature $S_j$ (with j comprised between 1 and 3) received by this node $R_i$, a circle is established in a two dimension orthogonal basis (x, y), the circle having:
as the centre, the position of that receiver node $R_i$, and
as the radius, the inter-node distance $D_{i,j}$ computed for that receiver node $R_i$ and for the acoustic signature $S_j$ received by that receiver node $R_i$.

This concentric circle is representative of potential positions of a sender node having transmitted the acoustic signature $S_j$ relative to the receiver node $R_i$. The circle is determined by means of the following classical equation:

$$(x-a_i)^2 + (y-b_i)^2 = (c \cdot T_{i,j})^2 = D_{i,j}^2 \tag{1}$$

with:
$a_i$ and $b_i$, the coordinates of the receiver node $R_i$,
$D_{i,j}$, the inter-node distance computed for the receiver node $R_i$ having received the acoustic signature $S_j$, with $D_{i,j} = c \cdot T_{i,j}$ (c being a value of the underwater acoustic sound velocity, and $T_{i,j}$ the propagation duration obtained for the receiver node $R_i$ and the acoustic signature $S_j$).

In practice ordinate $b_i$ is set to 0 in order to set the receiver streamer 62 at the ordinate axis of the orthogonal basis and abscise $a_i$ corresponds to the position of the receiver nodes $R_i$ on the receiver streamer 62 accordingly the known structural information of that streamer (in-line distances between receiver nodes are known in advance either by the navigation system or the node manager system). The coordinate basis has as origin (Ox, Oy) a predefined point at seismic vessel level.

Figure 7:
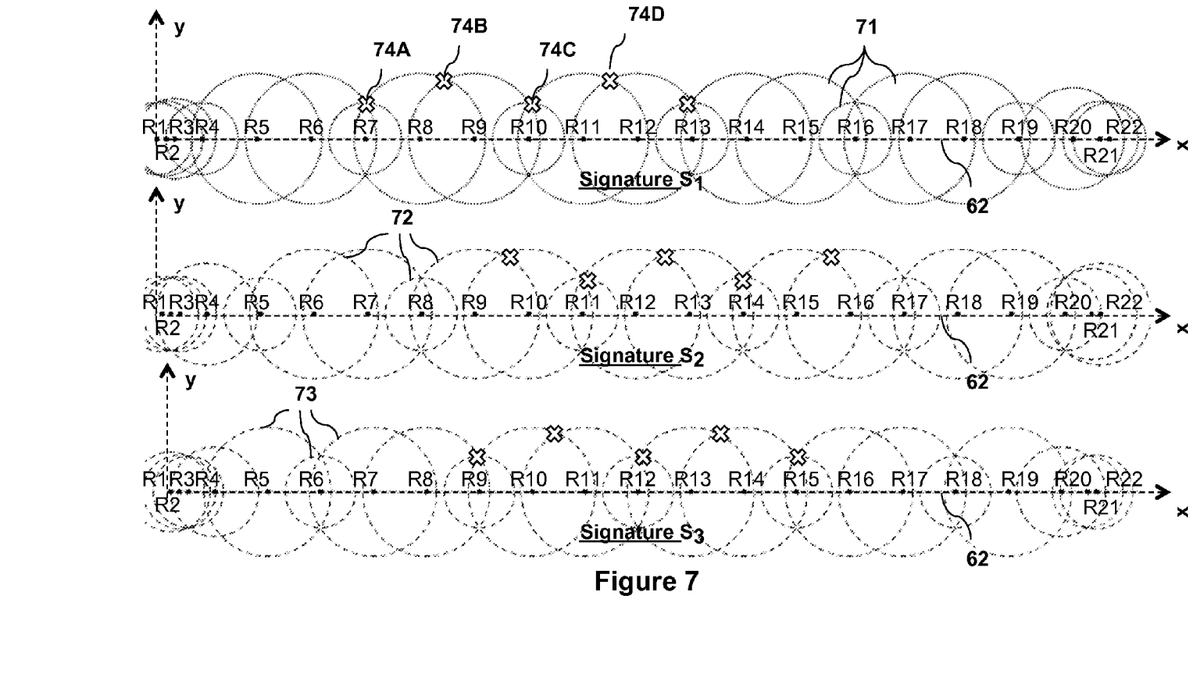

Thus, as shown in FIG. 7, it is established:
a plurality of first circles 71 for the signature $S_1$ each being associated with one of the receiver nodes $R_i$ of the streamer 62,
a plurality of second circles 72 for the signature $S_2$, each being associated with one of the receiver nodes $R_i$ of the streamer 62.
a plurality of third circles 73 for the acoustic signature $S_3$, each being associated with one of the receiver nodes $R_i$ of the streamer 62.

In step 35, for each of the acoustic signatures $S_1$, $S_2$, $S_3$, the estimation algorithm determines a set of intersection points (illustrated by crosses in FIG. 7) between the circles established for each pair of consecutive receiver nodes ($R_i$, $R_{i+1}$), ($R_{i+1}$, $R_{i+2}$), . . . etc.

It should be noted that two intersection points determined with acoustic signals of a same signature are assumed to refer to the same intersection point if the gap between those two intersection points is lower than a predetermined threshold (such as 5 meters for example).

If no intersection point is found for a pair of consecutive receiver nodes ($R_i$, $R_{i+1}$), these consecutive receiver nodes are assumed not to have recorded an acoustic signature $S_j$ coming from a same sender node $E_i$.

In a particular embodiment, it should plan to keep the positive or negative root of the second degree equation (1), in order to speed up the computation process of intersection points. In the example of FIG. 6, only the half-circles comprised in the half-plan placed above the receiver streamer 62 (positive Y-coordinates) can be taken into account in the orthogonal basis. This avoids to take into account intersection points corresponding to negative Y-coordinates and so that do not actually match with sender nodes of the streamer 61.

Next, the algorithm goes to the step 36, which consists in verifying if intersection point determined in the prior step 35 actually match the sender nodes $E_i$ of the streamer 61. Knowing the order of sender nodes on the streamer 61 and the in-line distances separating them (the structure of streamers is defined during its manufacturing, and the distances between nodes are thus well known), the computed intersection points are then crossed with those in-line distances. The distances between intersection points are compared to the known inline distances step by step between two (consecutive or not) sender nodes, according to the arrangement of the nodes on the streamer 61. If the difference between the known in-line distance and the distance between two given intersection points is lower than a predetermined threshold, the two intersection points are considered as match the two sender nodes whose the in-line distance between them was used in the computation. The principle of this step is described in greater details below in relation with FIGS. 4 and 5.

Figure 8:
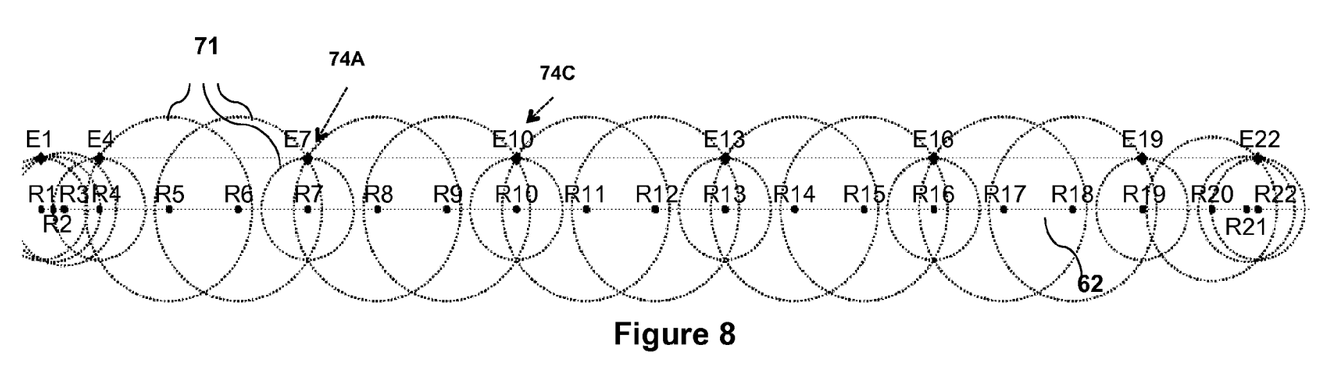

As shown on the example of FIGS. 7 and 8, for the signature $S_1$, the in-line distance between the sender nodes $E_7$ and $E_{10}$ matches perfectly with the distance separating the intersection points 74A and 74C. Therefore the estimation algorithm allocates the matching intersection points 74A and 74C with the sender nodes $E_7$ and $E_{10}$ respectively. The intersection points 74B and 74D are ignored for the following steps.

This step 36 may be carried out either for each acoustic signature (as described above) or for the three acoustic signatures (every intersection points are then compared to the known inline distances step by step). In the second case, the measurement redundancy leads to improve estimation accuracy.

According to an alternate embodiment of the present invention, the distances between intersection points are compared to the distance $d_i$ that separates a fixed sender node, for example $E_1$, from another sender node $E_i$ of the seismic streamer 61. Each intersection point is then crossed with the in-line distances $d_i$ of the streamer 61 computed from a fixed node to deduce, when they match, the position of a sender node $E_i$.

According to another alternate embodiment, the distance $d_i$ can be defined on a different basis, not from the first sender node $E_1$ but from a sender node $E_i$ whose the position has been previously determined a high measurement accuracy (e.g. $E_7$), with the assumption that the distance $d_i$ between that sender node $E_i$ and another sender node of the streamer 61 (e.g. $E_{10}$) is also known by the unit implementing the present algorithm.

The result of the execution of step 36 for the signature $S_1$ is schematically depicted in FIG. 8. The position of the sender nodes of the first group of nodes (E1, E4, E7, E10, E13, E16, E19, E22), which have sent the first acoustic signature $S_1$, has been computed and recorded.

At the end of the step 36, every matching intersection points are allocated to the sender node of the streamer 61, and the inter-node distances are deduced from those matching intersection points (as a reminder, each intersection point is associated with a value of inter-node distance from which this intersection point has been computed).

Figure 9:
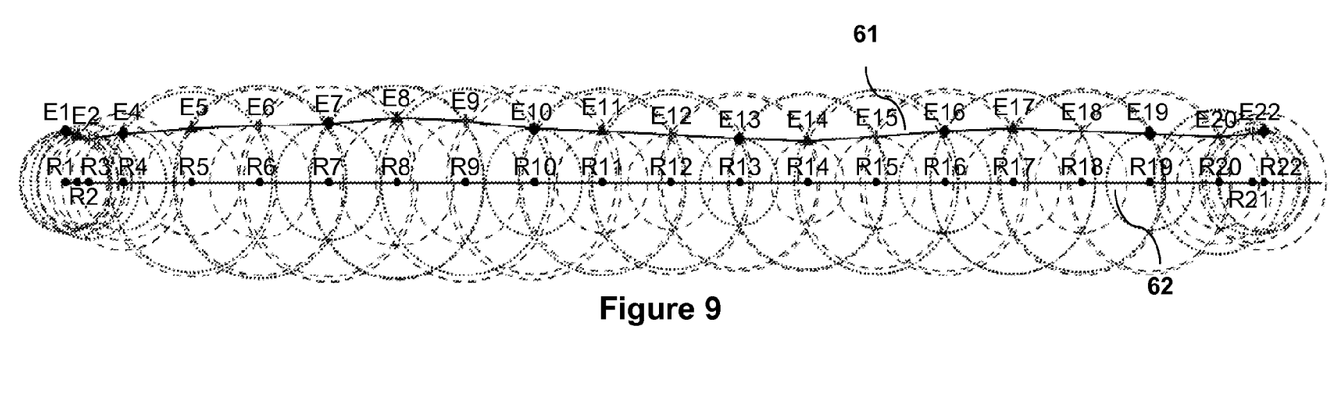

In step 37, the position of the streamer 61 relatively to the streamer 62 can be then estimated as a function of the inter-node distances deduced from the preceding step, as illustrated on FIG. 9.

FIG. 9 represents a schematic illustration in which the matching intersection points are materialized for the acoustic signatures $S_1$, $S_2$ and $S_3$.

The measurement redundancy with each acoustic signature $S_1$, $S_2$, $S_3$ allows to improve accuracy of the relative position of the sender streamer 61 relatively to the receiver streamer 62, in particular in case a strongly deformed streamer 61.

Figure 4:
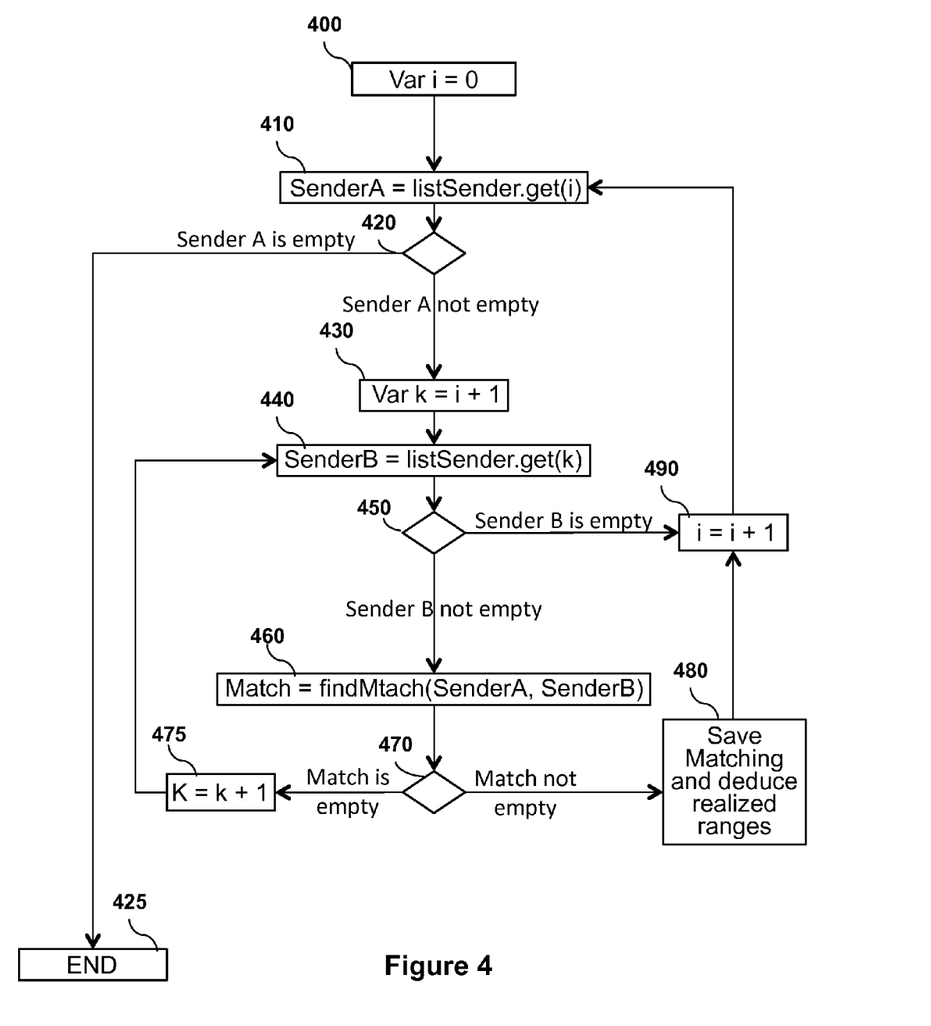
FIG. 4 is a flowchart illustrating a detailed example of an algorithm of determining of intersection points that can be implemented in the particular embodiment of FIG. 3.

FIG. 4 is a flowchart illustrating an implementation example of the step 36 of FIG. 3. Step 36 aims at selecting, among a set of intersection points, a sub-set of intersection points as a function of predetermined distances of the streamer 61. This algorithm is hereafter called "deduction algorithm".

In step 400, when the algorithm is initiated, we affect to the variable i the value 0. Then, in step 410, we affect to the variable SenderA the $i^{th}$ element of the list listSender.get(i). This list comprises the set of sender nodes ordered by ascending order on the streamer 61 (Sender $E_1$, $E_2$, . . . , $E_{21}$, $E_{22}$) from the abscise axis ("ascending offset").

The step 420 consists in testing if the variable SenderA is empty, i.e. if every sender nodes have been tested. If so, the algorithm goes to step 425. If not (every sender nodes have not been tested), the algorithm goes to step 430 in which we affect to the variable k the value i+1.

Then, in step 440, we affect to the variable SenderB the $k^{th}$ element of the list listSender.get(k), in order to take into account in the algorithm the sender node which follows the sender node A in the list of sender nodes.

Step 450 consists in testing if the variable SenderB is empty. If not, the algorithm goes to step 460. If so, the algorithm goes to step 490 in which the variable i is incremented by 1 (i=i+1), then is fed back to step 410 in order to test the following sender A of the list.

Figure 5:
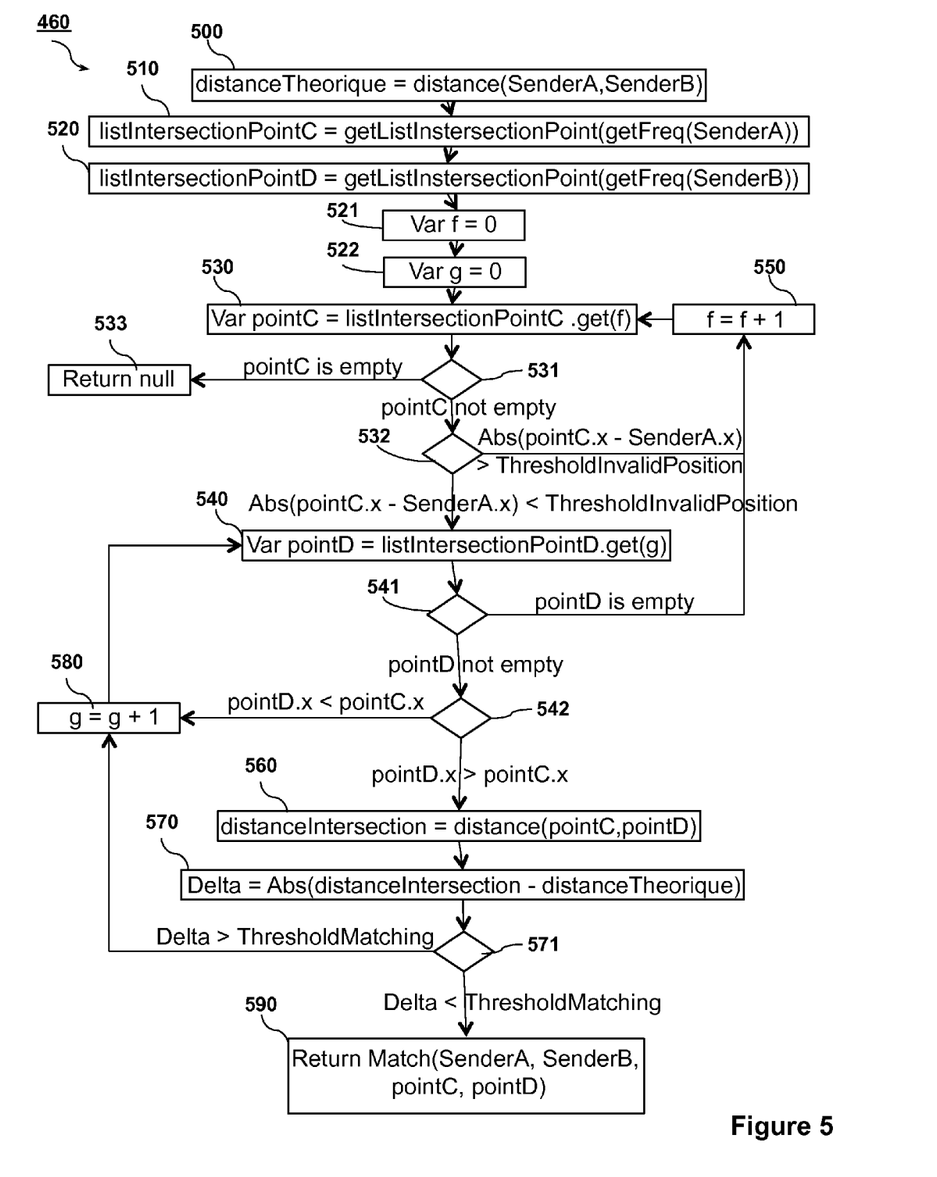
FIG. 5 is a flowchart illustrating a detailed example of an algorithm of a matching step that can be implemented in the particular embodiment of FIG. 4.

If the variable SenderB is not empty, the algorithm goes to step 460 in which the algorithm findMatch illustrated in FIG. 5 is executed for the current Sender A and Sender B.

Next, step 470 consists in testing if the variable Match is empty. If so, the algorithm goes to step 475 to increment the variable k by 1 (k=k+1), then goes back to step 440. Otherwise the algorithm goes to step 480 in which the inter-node distance is deduced from each matching intersection point determined in step 460. Then, after matching intersection point determined, the process is repeated by feeding back to step 490 in which the variable i is incremented by 1, then to step 410 to test the following sender A of the list. If the variable SenderA is empty (test of step 420), the deduction algorithm is completed (step 425). FIG. 5 is a flowchart illustrating a detailed implementation example of the matching step 460 that can be implemented in the particular embodiment of FIG. 4.

In step 500, when the algorithm is initiated, we obtain the predetermined in-line distance separating the sender A from the sender B (distanceTheorique).

Then, in step 510, we affect to the variable listIntersectionPointC the list of the intersection points associated to the acoustic signature ($S_1$, $S_2$ or S3) emitted by the sender A (ListInstersectionPoint(getFreq(SenderA)), the list of intersection points being ordinated in ascending order from the abscise axis ("ascending offset"). In step 520, we affect to the variable listIntersectionPointD the list of the intersection points associated the acoustic signature emitted by the sender B (ListInstersectionPoint (getFreq(SenderB)), the list of intersection points being ordinated in ascending order from the abscise axis ("ascending offset").

In steps 521 and 522, we affect to the variable f and g the value 0 respectively.

In step 530, we affect to the variable pointC the $f^{th}$ element of the list listIntersectionPointC.

In step 531, we test if the variable pointC is empty (i.e. if every intersection points associated with the sender B have been tested by the algorithm). If so, the algorithm goes to step 533 (return null), otherwise the algorithm goes to step 532 in which another test is carried out to know if the gap comprised between the sender A theoretical position (SenderA.x) and the tested intersection point (pointC.x) is upper than a threshold value (ThresoldInvalidPosition). If so, this means that the sender A theoretical position is too far from the intersection point and this latter is then cancelled. The algorithm goes to step 550 in which the variable f is incremented by 1 in order to test the next intersection point.

In step 540, we affect to the variable pointD the $g^{th}$ element of the list listIntersectionPointD.

Step 541 consists in knowing if the variable pointD is empty (i.e. if every intersection points associated with the sender B have been tested by the algorithm). If so, the algorithm goes to step 550 in which the variable f is incremented by 1 in order to test the next intersection point. Otherwise the algorithm goes to step 542 in which we carry out a consistency check. We check if the sender A is located before the sender B: the point B offset (pointD.x) shall be upper than the point A offset (pointC.x). If so, the algorithm goes to step 560. If not, the algorithm goes to step 580 in which the variable g is incremented by 1 in order to test the next intersection point.

In step 560, we affect to the variable distanceIntersection the euclidienne distance between the intersection points pointC and pointD (distance(pointC, pointD)).

The following step 570 consists in computing the gap between the theorical distance (distanceTheorique) and the distance between the two intersection points pointC and pointD.

If this gap is upper than a threshold value (ThresholdMatching), the algorithm goes to step 580 in which the variable K is incremented by 1 in order to test the next intersection point. That means that the two intersection points pointC and pointD do not match the two sender A and B.

If this gap is lower than the threshold value (ThresholdMatching), it is considered that the two intersection points pointC and pointD correspond the two sender A and B. The algorithm goes to step 580 which returns the set of data Match (Sender A, Sender B, pointC and pointD) to the algorithm of FIG. 4 (go back to step 460). The intersection point pointC being allocated to the sender A and the intersection point pointD being allocated to the sender B.

As a reminder, it should be noted that if two intersection points determined by means of acoustic signals of a same signature have a gap that is lower than a predetermined threshold, they are assumed to be the same intersection point. Thus, if a sender node is allocated to an intersection point, all points assimilated to said intersection point shall be allocated that sender node.

Figure 10:
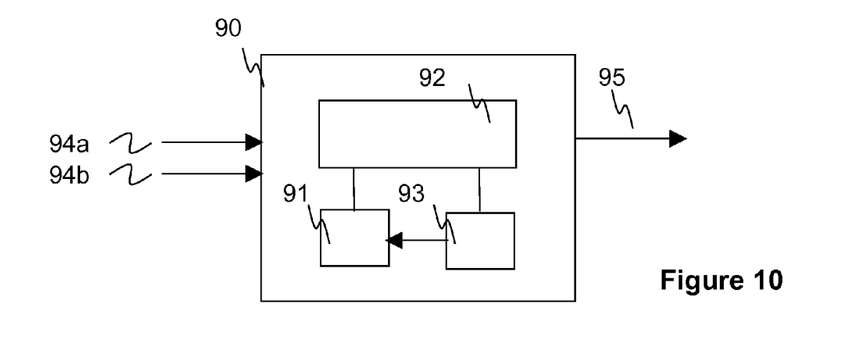
FIG. 10 shows the simplified structure of an estimation device according to a particular embodiment of the invention.

FIG. 10 depicts the simplified structure of an estimation device 90 (for estimating a distance of a seismic streamer relatively to another one) according to a particular embodiment of the invention.

The estimation device 90 can be the node manager system or the navigation system. It comprises a read-only memory (ROM) 93, a random access memory (RAM) 91 and a processor 92. The read-only memory 93 (non transitory computer-readable carrier medium) stores executable program code instructions, which they are executed by the processor 92 enable implementation of the method of the invention (e.g. the steps 33 to 37 of FIG. 3).

Upon initialization, the aforementioned program code instructions are transferred from the read-only memory 93 to the random access memory 91 so as to be executed by the processor 92. The random access memory 91 likewise includes registers for storing the variables and parameters required for this execution. The processor 92 receives the following information (referenced 94a to 94b respectively):

a value of the sound velocity c, propagation durations each associated with a receiver node and a distinct acoustic signature (if the computation of the inter-node distance is carried out by the navigation system or the node manager system) or inter-node distances (if the computation of the inter-node distances are carried out prior by the receiver nodes).

According to the program code instructions, the processor 92 executes the program code instructions allowing to the estimation device to deliver an estimation 95 of the distance of a seismic streamer relatively to another one.

All the steps of the estimation method according to the invention can be implemented equally well:

by the execution of a set of program code instructions executed by a reprogrammable computing machine such as a PC type apparatus, a DSP (digital signal processor) or a microcontroller. This program code instructions can be stored in a non-transitory computer-readable carrier medium that is detachable (for example a floppy disk, a CD-ROM or a DVD-ROM) or non-detachable; or by a dedicated machine or component, such as an FPGA (Field Programmable Gate Array), an ASIC (Application-Specific Integrated Circuit) or any dedicated hardware component.

It should be noted that the invention is not limited to a purely software-based implementation, in the form of computer program instructions, but that it can also be implemented in hardware form or any form combining a hardware portion and a software portion.

Although the present disclosure has been described with reference to one exemplary embodiment, alternatives can be envisaged. In particular, the algorithm described above in relation with FIG. 3 is implemented for estimating the position of a first seismic streamer relatively to a second seismic streamer. One can envisage to implement a method for estimating the position of a first seismic streamer relatively to several other seismic streamers of the streamer network without departing from the scope of the disclosure, these other seismic streamers can be or not adjacent to the first streamer.

Furthermore, the present disclosure describes an exemplary method for estimating the position of two seismic streamers that are both totally deployed. The present invention can also be applied for estimating continuously the relative position of seismic streamers in deployment or retrieve phase, so as to control in real-time the position of the streamers and thereby prevent from the risk of tangles of streamers.

An embodiment of the disclosure provides a faster and more precise technique than the known solutions discussed above in order to estimate the position of a seismic streamer, notably in retrieve or in deployment, relatively to at least another seismic streamer.

An embodiment of the disclosure provides a technique that decreases the number of devices dedicated to the streamer position computing (magnetic compasses, GPS, etc.).

An embodiment of the disclosure provides a technique of this kind that does not require a prior knowledge of the acoustic sequence implemented in the acoustic network.

An embodiment of the disclosure provides a technique of this kind that avoids reconfiguring the acoustic sequence periodically when the streamers are in retrieve or deployment phase and so that enables a faster deployment of the streamers.

An embodiment of the disclosure provides a technique of this kind that is simple to implement and costs little.

Although the present disclosure has been described with reference to one or more examples, workers skilled in the art will recognize that changes may be made in form and detail without departing from the scope of the disclosure and/or the appended claims.

The invention claimed is:

1. A method comprising:
    a phase of deploying a first acoustic antenna from a vessel or retrieving the first acoustic antenna to the vessel; and
    estimating a position, during the phase of deployment or retrieval, of the first acoustic antenna relative to a second acoustic antenna belonging to a network of towed acoustic antennas on which are arranged a plurality of synchronized nodes, wherein estimating comprises acts of:
    (a) setting a first plurality of nodes arranged on said first acoustic antenna so that they act as sender nodes and a second plurality of nodes arranged on said second acoustic antenna so that they act as receiver nodes;
    (b) forming at least a first group of sender nodes among the nodes acting as sender nodes of the first antenna, each sender node of said at least first group sending a same first acoustic signature;
    (c) for each receiver node of the second antenna:
        obtaining a propagation duration elapsed between an emission instant of said first acoustic signature and a reception instant of said first acoustic signature received by said receiver node; and
        establishing a geometrical figure representative of potential positions of a sender node of the first antenna, said geometrical figure comprising at least one portion of a circle having, as the centre, a position of said receiver node and, as the radius, an inter-node distance which is a function of the propagation duration obtained for said receiver node and said first acoustic signature;
    (d) determining a set of common points between the geometrical figures established for pairs of consecutive receiver nodes arranged on the second antenna; and
    (e) estimating the position of said first acoustic antenna relative to said second acoustic antenna as a function of said set of common points and predetermined distances between the sender nodes of said first group of nodes.

2. A method according to claim 1, wherein the act (b) further comprises forming at least another group of sender nodes, each another group of sender nodes sending another distinct acoustic signature,
    and wherein the acts (c), (d) and (e) are carried out for each another group of sender nodes sending a distinct acoustic signature, each receiver node being configured to receive all the signatures.

3. A method according to claim 1, wherein said at least one portion of a circle is established in a predefined orthonormal basis in accordance with the following equation:

$$(x-a_i)^2+(y-b_i)^2=c^2 \cdot T^2$$

where:
    $a_i$ and $b_i$ are the coordinates of a receiver node of index i,
    c is a value of the underwater acoustic sound velocity,
    T is the propagation duration obtained for the receiver node of index i.

4. A method according to claim 1, wherein said geometrical figure established for each receiver node comprises a half-circle defined in a half-plan predetermined in relation to said second acoustic antenna.

5. A method according to claim 2, wherein, for a same acoustic signature, if two distinct intersection points are determined for two consecutive pairs of receivers nodes comprising a common receiver node, said two intersection points are assumed to be a single common point if said two intersection points have a gap lower a threshold value of gap.

6. A method according to claim 1, wherein said first and second acoustic antennas are non-adjacent among the network of acoustic antennas.

7. A non-transitory computer-readable carrier medium storing a program which, when executed by a computer or a processor, causes the computer or the processor to carry out a method for estimating a position of a first acoustic antenna relative to a second acoustic antenna belonging to a network of towed acoustic antennas on which are arranged a plurality of synchronized nodes, wherein the method comprises acts of:
    during a phase of deploying the first acoustic antenna from a vessel or retrieving the first acoustic antenna to the vessel:

(a) setting a first plurality of nodes arranged on said first acoustic antenna so that they act as sender nodes and a second plurality of nodes arranged on said second acoustic antenna so that they act as receiver nodes;

(b) forming at least a first group of sender nodes among the nodes acting as sender nodes of the first antenna, each sender node of said at least first group sending a same first acoustic signature;

(c) for each receiver node of the second antenna:
   obtaining a propagation duration elapsed between an emission instant of said first acoustic signature and a reception instant of said first acoustic signature received by said receiver node; and
   establishing a geometrical figure representative of potential positions of a sender node of the first antenna, said geometrical figure comprising at least one portion of a circle having, as the centre, a position of said receiver node and, as the radius, an inter-node distance which is a function of the propagation duration obtained for said receiver node and said first acoustic signature;

(d) determining a set of common points between the geometrical figures established for pairs of consecutive receiver nodes arranged on the second antenna; and (e) estimating the position of said first acoustic antenna relative to said second acoustic antenna as a function of said set of common points and predetermined distances between the sender nodes of said first group of nodes.

8. A device for estimating a position of a first acoustic antenna relative to a second acoustic antenna belonging to a network of towed acoustic antennas on which are arranged a plurality of synchronized nodes, wherein said device comprises:
   means for setting a first plurality of nodes arranged on said first acoustic antenna so that they act as sender nodes and a second plurality of nodes arranged on said second acoustic antenna so that they act as receiver nodes;
   means for forming at least a first group of sender nodes among the nodes acting as sender nodes of the first antenna, each sender node of said at least first group sending a same first acoustic signature;
   means for obtaining, for each receiver node of the second antenna, a propagation duration elapsed between an emission instant of said first acoustic signature and a reception instant of said first acoustic signature received by said receiver node;
   means for establishing, for each receiver node of the second antenna, a geometrical figure representative of potential positions of a sender node of the first antenna, said geometrical figure comprising at least one portion of a circle having, as the centre, a position of said receiver node and, as the radius, an inter-node distance which is a function of the propagation duration obtained for said receiver node and said first acoustic signature;
   means for determining a set of common points between the geometrical figures established for pairs of consecutive receiver nodes arranged on the second antenna; and
   means for estimating the position of said first acoustic antenna relative to said second acoustic antenna as a function of said set of common points and predetermined distances between the sender nodes of said first group of nodes, during a phase of deploying the first acoustic antenna from a vessel or retrieving the first acoustic antenna to the vessel.

* * * * *